Aug. 30, 1960 M. F. SHEARD 2,950,720
GRAIN SEPARATOR
Filed Jan. 14, 1957 7 Sheets-Sheet 1

INVENTOR.
Marville F. Sheard
BY
Atty.

Aug. 30, 1960 M. F. SHEARD 2,950,720
GRAIN SEPARATOR
Filed Jan. 14, 1957 7 Sheets-Sheet 2

INVENTOR.
Marville F. Sheard
BY
Atty.

INVENTOR.
Marville F. Sheard

Aug. 30, 1960 M. F. SHEARD 2,950,720
GRAIN SEPARATOR

Filed Jan. 14, 1957 7 Sheets-Sheet 4

INVENTOR.
Marville F. Sheard
BY
Atty.

Aug. 30, 1960  M. F. SHEARD  2,950,720
GRAIN SEPARATOR
Filed Jan. 14, 1957  7 Sheets-Sheet 5
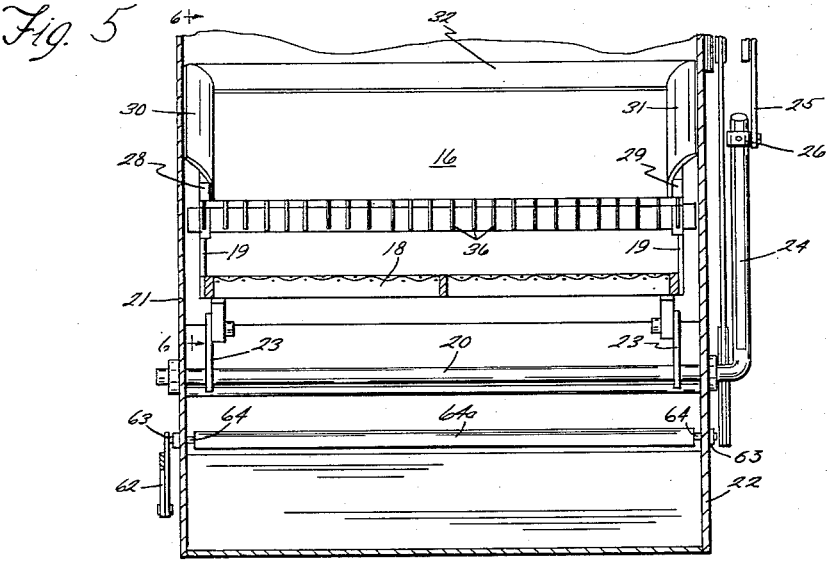
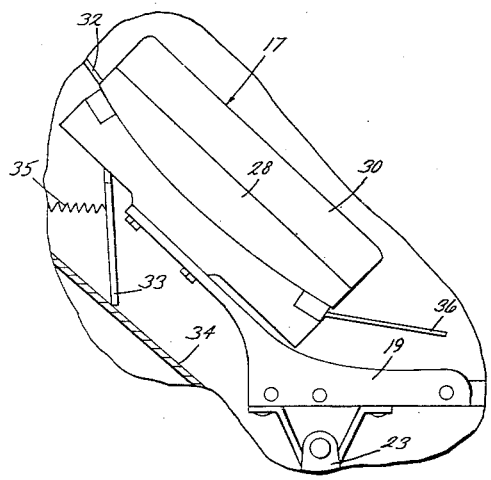
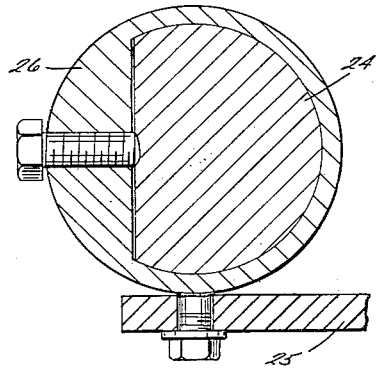
INVENTOR.
Marville F. Sheard
BY
Fred Wells
Atty.

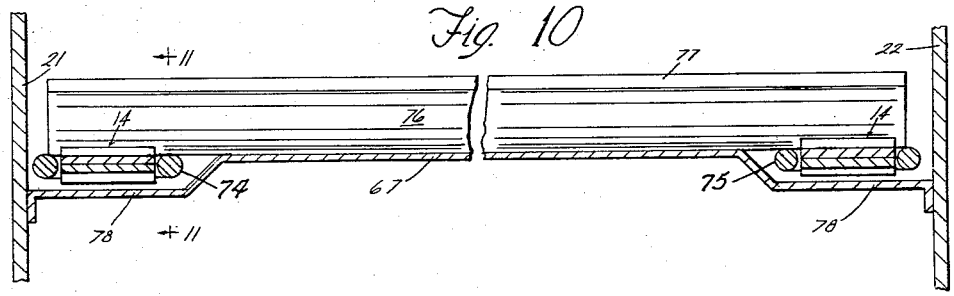
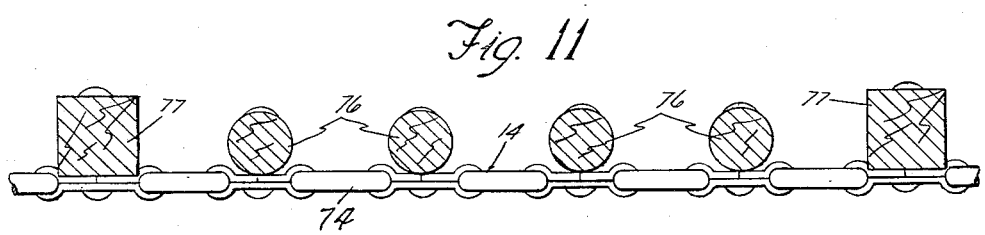
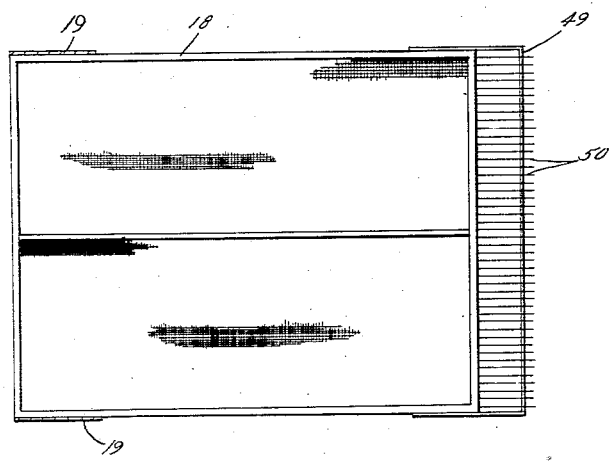
INVENTOR.
Marville F. Sheard

United States Patent Office 2,950,720
Patented Aug. 30, 1960

2,950,720
GRAIN SEPARATOR
Marville F. Sheard, Athena, Oreg.

Filed Jan. 14, 1957, Ser. No. 634,091

3 Claims. (Cl. 130—21)

My invention relates to a grain separator and has for its general object the provision of a separating mechanism for combine harvesters that avoids the loss of grain at the discharge end of the machine. This loss can be shown, by examination of the ground behind the harvester, to be substantial. In harvesting wheat on land that is not level, for example, enough kernels of wheat can usually be found behind the harvester to mean a substantial loss in bushels per acre.

More specifically it is a purpose of my invention to provide a novel separator structure wherein the threshed grain is dropped upon an inclined saddle at the front of the grain shoe as it is separated from the straw and directed by the saddle onto the shoe, and the saddle and shoe are moved in response to endwise tipping of the harvester substantially to overcome the throwing of grain out of the machine.

It is also a purpose of my invention to provide means to direct the air in the separator in relation to the grain shoe in such a manner as to keep the chaff floating and to divert its rearward travel abruptly upward just before it leaves the machine and thereby avoid loss of grain and unthreshed heads of grain.

According to my invention the separator uses an apron conveyor to carry the crop from the known threshing cylinder rearwardly to a raddle rake and above the inclined saddle at the front end of the grain shoe. Most of the grain is freed from the straw at this point and drops onto the inclined saddle and forwardly onto the screen of the grain shoe. The grain shoe and saddle are vibrated and an air stream is directed upwardly and rearwardly through the screen to float the chaff and any loose straw toward the rear. The straw is lifted and carried rearwardly by a raddle rake construction that collects kernels of grain and unthreshed heads and delivers them to the front portion of the shoe while the straw is carried to the rear of the machine and discharged. The unthreshed heads, floating chaff and straw particles moving to the rear on and above the screen, are met by an intersecting blast of air at the rear end of the screen which lifts the light particles and allows the heavier heads to pass down to a return auger returning them to the cylinder. The shoe and the saddle move together and the rear end of the shoe is counterbalanced and lifted and lowered to compensate for endwise tilting of the machine out of level. It is customary to keep the separator levelled transversely by suitable well known levelling devices and the present invention is applied to machines having such levelling devices.

The nature and advantages of my invention will be more clearly understood from the following detailed description and the accompanying drawings of a preferred embodiment of my invention. It should be understood, however, that the description and drawings are illustrative and that minor mechanical changes and modifications may be made within the scope of the claims defining my invention.

In the drawings:

Figure 5 is an enlarged fragmentary sectional view taken on the line 5—5 of Figure 3;

Figure 6 is a sectional view taken on the line 6—6 of Figure 5;

Figure 7 is an enlarged sectional view through the connection of the shaker arm to the link that drives it;

Figure 10 is an enlarged fragmentary sectional view taken on the line 10—10 of Figure 3;

Figure 11 is a sectional view taken on the line 11—11 of Figure 10;

Figure 12 is a reduced fragmentary plan sectional view taken on the line 12—12 of Figure 3;

Figure 1:
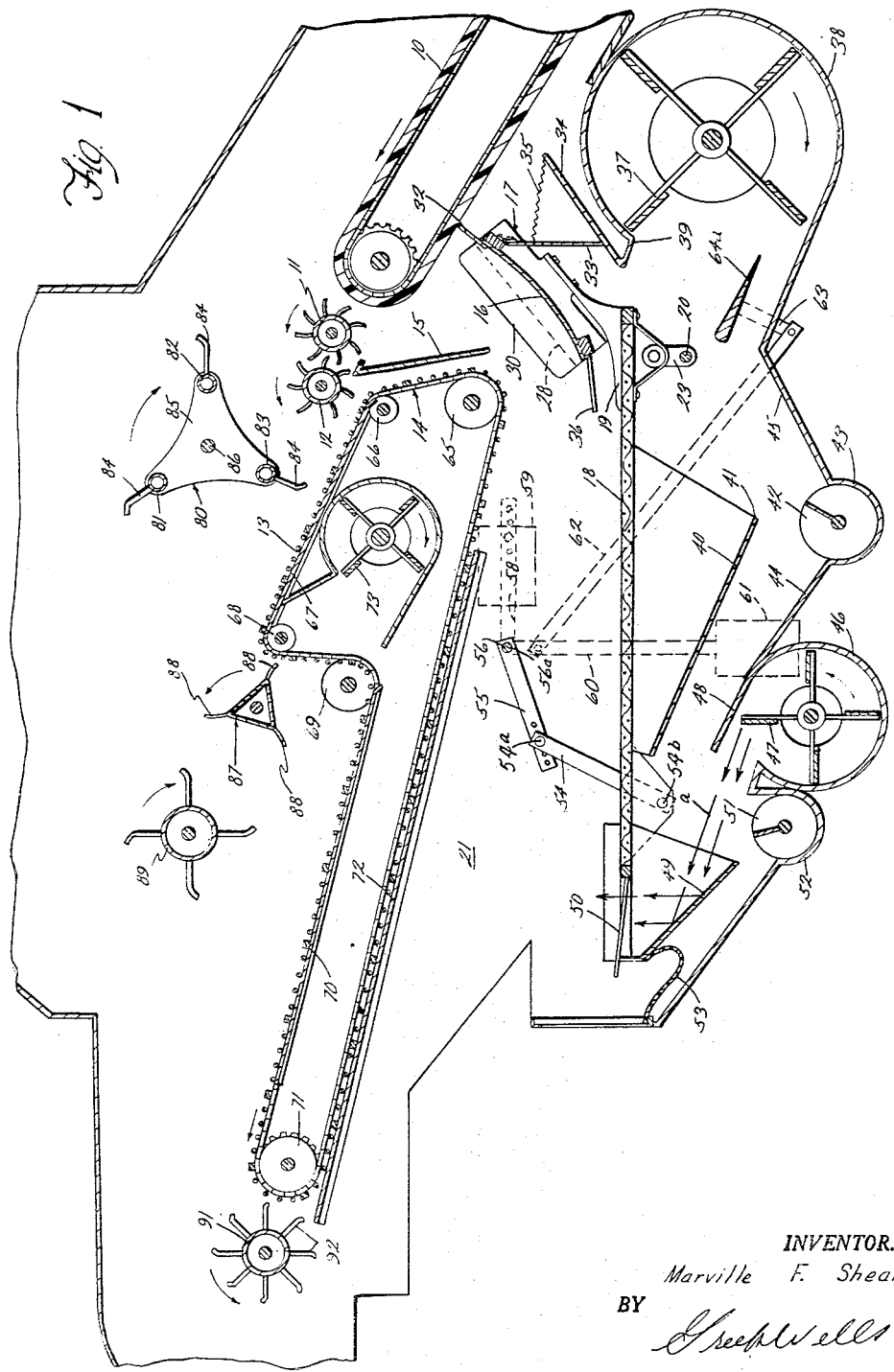
Figure 1 is a somewhat diagrammatic sectional view taken longitudinally through a separator embodying my invention.
Figure 2:
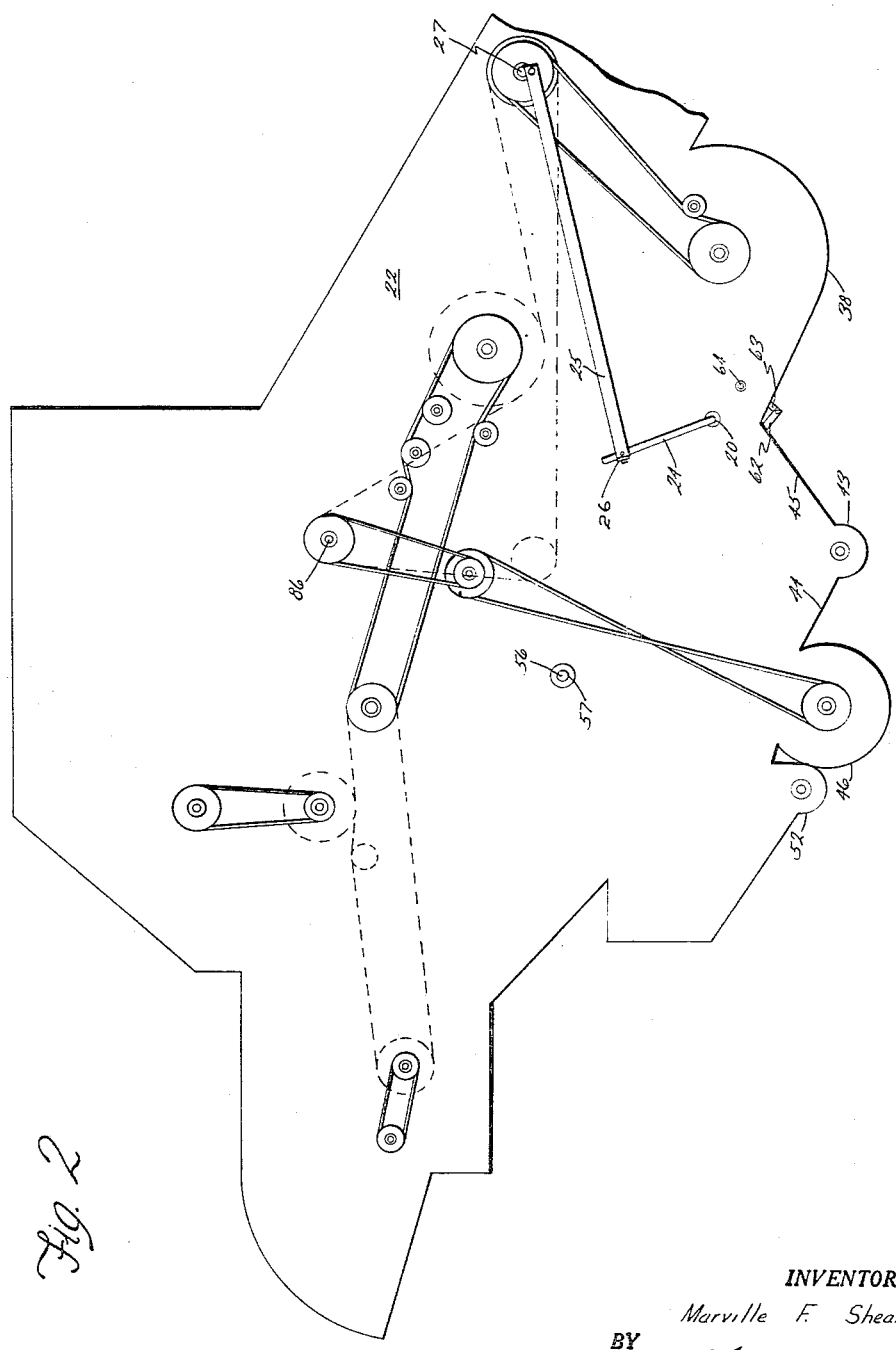
Figure 2 is a reduced side view of the separator illustrating some of the drive mechanism.

Referring now in detail to the drawings, my invention is embodied in a harvesting machine wherein the cut and threshed crop is fed by an apron conveyor 10 to a separator which functions to separate the kernels of grain from straw, chaff, etc., that accompanies the kernels on the conveyor 10. The parts involved in the separation are shown generally in Figures 1 to 4 inclusive. At the top or discharge end of the conveyor 10 and operating in close proximity thereto are two rotary beaters 11 and 12 that are adapted to lift coarse material and advance the material to a point where it will fall on the top flight 13 of a special drag raddle 14. A transverse baffle 15 deflects downwardly the grain and fine material passing under the beaters 11 and 12 or between them. The deflected material falls upon the inclined concave top surface 16 of a saddle member 17. This saddle member 17 is supported on the front end of a grain shoe 18 by two brackets 19. A shaft 20 journalled in the side walls 21 and 22 of the separator housing has two arms 23 projecting upwardly therefrom and pivotally supporting the brackets 19. Outside the wall 22 of the separator housing, the shaft 20 is bent upwardly and rearwardly to provide a crank arm 24 for connecting the shaft 20 to a power source to shake the shoe 18. The connection is by means of a link 25 having a coupling member 26 receiving the crank arm portion 24 of the shaft 20 and connected eccentrically to a power driven shaft 27. The coupling member 26 is slidable lengthwise of the crank arm portion 24 to vary the length of vibration stroke transmitted through the shaft 20 and the arms 23 to the grain shoe 18.

The saddle member 17 is provided with upstanding side walls 28 and 29 that are spaced from the walls 21 and 22 of the separator housing. These side walls have resilient guard strips 30 and 31 that keep chaff and dust from falling below the saddle member 17. Another resilient guard strip 32 is extended forwardly from the saddle surface 16 and upwardly against the return flight of the conveyor 10. Below the forward part of the surface 16 the saddle carries another guard strip 33 which is hinged to the saddle portion 17, and rides on an inclined baffle wall 34 that extends across the separator housing. A spring 35 keeps the strip 33 against the wall 34. In this way chaff, dust, etc. are kept from working forward beneath the conveyor 10 and the grain is directed rearwardly onto the shoe 18. The saddle member 17 has spaced rearwardly extending fingers 36 along its lower edge to carry any longer straws, etc. to the rear of the front end of the shoe 18.

The operation of the saddle member 17 to direct the grain, etc. rearwardly over the shoe 18 is a very important part of the operation of the machine in clearing the chaff, etc. from the grain. The saddle member 17 gives the grain a rearward impetus across an air stream that is blown up from beneath the shoe 18 from a blower 37. The blower 37 is located forwardly of and below the baffle wall 34. The outlet 39 of the housing 38 of the blower 37 directs air rearwardly and upwardly to flow mainly through the front portion of the shoe 18 and above a front grain pan 40 that depends from the mid portion of the shoe 18. The cleaned grain is removed by an auger 42 in a trough 43 directly beneath the discharge edge 41 of the grain pan 40. The housing of the separator has its bottom portions 44 and 45 sloping downward toward the trough 43 as is customary in grain separators of this type.

Rearwardly of the trough 43 a second blower housing 46 houses a blower 47 that is somewhat smaller than the blower 37. The blower 47 rotates in the opposite direction to the blower 37. A top tangential wall 48 directs air from the blower 47 into a second pan 49 that depends from the shoe 18 at the rear end of the shoe. This pan 49 cooperates with fingers 50 at the discharge end of the shoe 18 to direct unthreshed crop down to a return auger 51 in a trough 52 which returns the unthreshed crop for rethreshing and cleaning. A guard strip 53 of canvas prevents back feed of chaff.

The blower 47 and the pan 49 serve an important function in addition to that already described. The position of the pan 49 with respect to the direction of the air stream discharged by the blower 47 is such as to intercept and deflect this air stream abruptly upward through the fingers 50 and the rear end of the shoe 18 as shown by the arrows *a* in Figures 1, 3 and 4. This upward stream of air meets the rearwardly travelling chaff, etc. above the shoe and helps to prevent carry over of grain with the lighter material since the heavier grain will be segregated from the lighter particles and settle into the upward blast and be recovered. The lighter particles are lifted higher and discharged from the rear end of the machine. The combination of the saddle member 17 and the particular air directing means just described, with the shoe 18, has, I have found, greatly reduced the loss of crop over the shoe. The combination with the saddle member 17 of the guard strip 33 also prevents the conveyor 10 from back feeding because it stops eddying of air from the blower 37 which acts to drive chaff, etc. between the flights of the conveyor 10. The connection of the shaft 20 to the drive shaft 27 is such that the arms 23 are upright at the rearmost limit of movement. Thus the front end of the shoe is retracted forward, then pushed up and back.

Provision is also made to move the shoe to compensate somewhat for endwise tipping of the machine in going up hill or down hill. I am aware, of course, that provision to compensate for endwise tipping is not broadly new. This compensation as applied herein includes counter-balancing of the shoe weight. The rear portion of the shoe is supported by links 54, one at each side. These links 54 are pivoted to the shot 18 as indicated at 54b at a point just in front of the rear pan 49 and extend upward to connect adjustably by adjustable connection means indicated at 54a to lever arms 55, one at each side of the machine. The lever arms 55 are fixed to a shaft 56 and lie just inside the side walls 21 and 22 of the machine. The shaft 56 is journalled in bearings 57 on the side walls 21 and 22. One end 56a of the shaft 56 fixedly mounts a counter-weight arm 58 extending forwardly outside the wall 21. A counterweight 59 is adjustably mounted on the arm 58. This end 56a of the shaft also fixedly mounts a pendulum arm 60 that makes an angle of 80 degrees with the lever arms 55. The arm 60 carries a weight 61. The connections just described are preferably such that when the machine is on level ground the rear end of the shoe is raised slightly when the pendulum is at rest. Thus the level compensation is more when going up hill than when going down. When the front end of the machine is raised as in going up hill, the pendulum 60, 61 swings rearwardly with respect to the separator housing to maintain its vertical position with respect to the ground. This action pivots the arms 55 upwardly with respect to the housing and through the arms 54, raises the rear end of the shoe 18 with respect to the housing to maintain it in substantially level position. Due to the fact that the shaft 56, about which the pendulum 60, 61 pivots is spaced rearwardly from the pivot point (on arms 23 of shaft 20) for the shoe 18, and the fact that the arms 54 and 55 are short compared with the distances between the shaft 20, the shaft 56 and the pivot points 54b of the levers 54 with the shoe 18, the movement of the shoe 18 toward level will not be complete, and the shoe 18 will come to rest below a level position. I have found, however, that the levelling compensation effected by the pendulum 60, 61 does keep the shoe 18 close enough to a level position to prevent loss of grain over the rear of the shoe.

Figure 3:
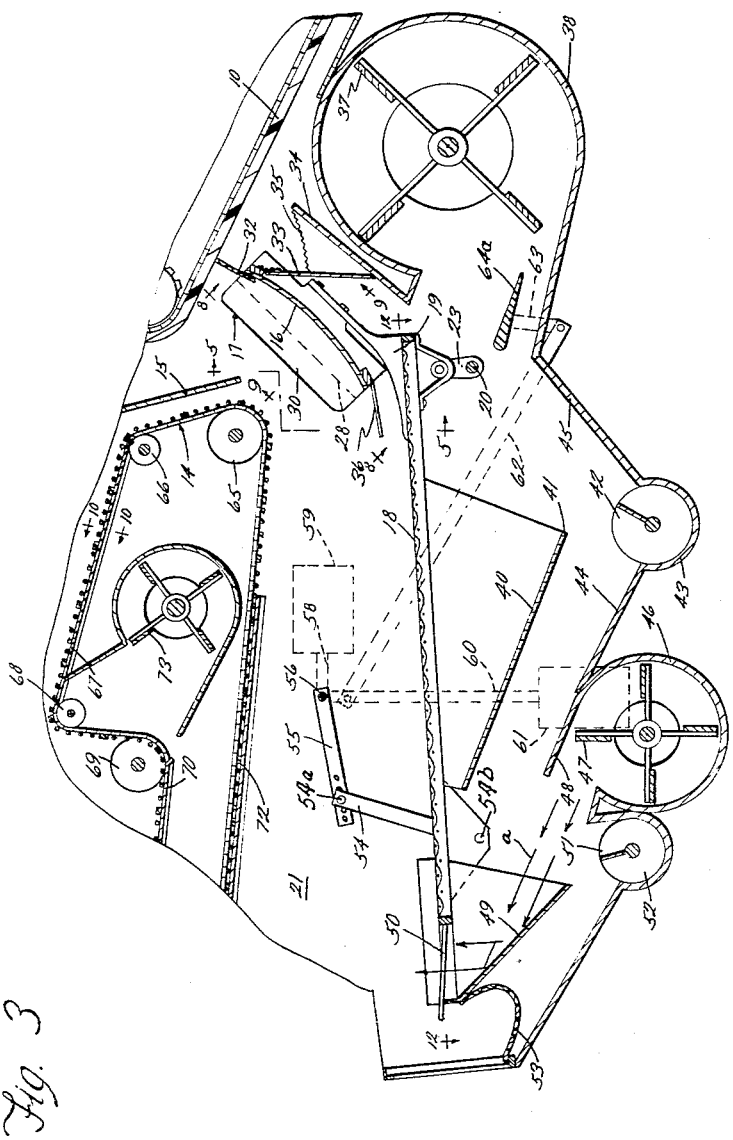
Figure 3 is a fragmentary sectional view similar to Figure 1, but showing the positions of the grain shoe and saddle relative to the separator housing when the housing is inclined upwardly as when travelling up hill.
Figure 4:
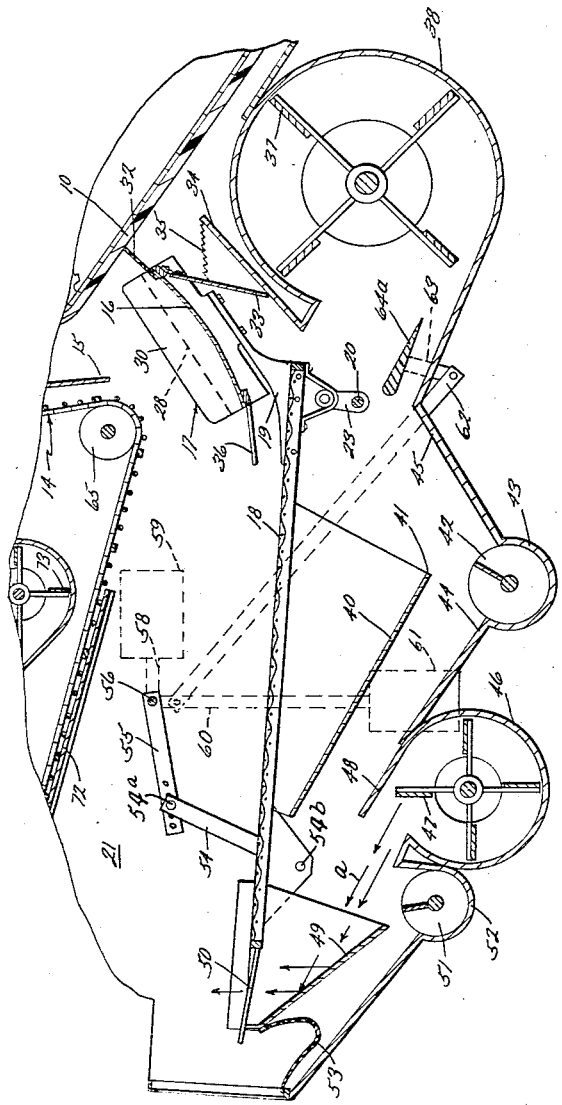
Figure 4 is a fragmentary sectional view similar to Figure 1, but showing the positions of the grain shoe and saddle relative to the separator housing when the housing is inclined downwardly as when travelling down hill.
Figure 8:
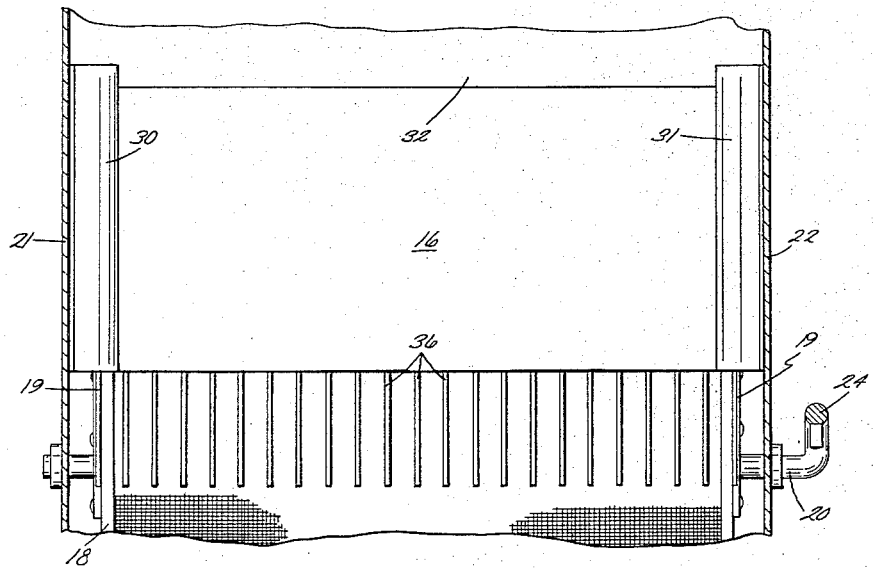
Figure 8 is an enlarged fragmentary sectional view taken on the line 8—8 of Figure 3.
Figure 9:
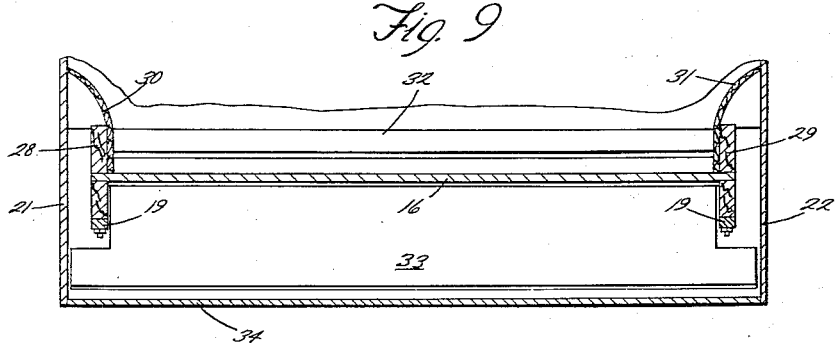
Figure 9 is an enlarged fragmentary sectional view taken on the line 9—9 of Figure 3.

The pendulum arm 60 is also connected by a link 62 to an arm 63 on a shaft 64 that is journalled in the side walls 21 and 22 and mounts an air deflector 64a in the outlet from the blower 37. The function of the deflector is to direct the air from the blower 37 against the shoe in such a manner as to offset in part the effect of tipping of the shoe 18. It is evident that when the rear end of the shoe 18 is lowered with respect to the front end thereof, the reaward travel of the grain, etc. falling on the shoe will be easier as the travel will be down hill. The pendulum arm 60 is so connected to the air deflector 64 as to cause the air to be deflected upwardly more as the rear end of the shoe 18 is lowered. Figures 3 and 4 illustrate how the parts change position when the machine is going up hill (Figure 3) and when it does down hill (Figure 4). Note that in either position the saddle member 17 is located to receive the falling material and deflect it rearwardly onto the shoe 18. The baffle 15 directs the material down onto the surface 16 of the saddle member 17.

The straw advancing mechanism includes the drag raddle 14, and several beaters, together with a blower within the path of the raddle to clear it. Starting at the lowermost point behind the baffle 15, the raddle passes from a guide roller 65 upwardly over a smaller roller 66, then over a drag board 67 to a guide roller 68 and downwardly beneath a guide roller 69, then over another drag board 70 to two drive sprockets 71, and down over a drag board 72 to the roller 65. A blower 73 is located just below the drag board 67 and has its discharge outlet aimed toward the space between the rollers 68 and 69 so as to blow through the raddle and keep straw and chaff out.

The raddle 14 is made up of two sprocket chains 74 and 75 (see Figures 10 and 11) and cross bars 76 and 77 that are riveted to links of the chains 74 and 75. The bars 76 are round, about ½ inch in diameter and the bars 77 are rectangular and somewhat larger. The bars are shown as wooden but they may be of any suitable material. A typical cross section through a drag board and the drag raddle 14 is shown in Figure 10. With this construction the grain and unthreshed heads freed from the straw over the raddle will be swept along by the bars 76 and 77. The drag raddle bars 77 act to keep straws from dragging under. Also they act to provide straight surfaces that will slide the threshed out grain along the drag boards to points where the grain can drop down. The drag boards 67 and 70 are depressed adjacent to the side walls 21 and 22 as indicated at 78 and 79 to receive the chains 74 and 75.

The upper ends of the drag board 67 are extended beyond the axes of the rollers 66 and 68 and are curved down. The lower end of the drag board 70 is curved downward. The upper end of the drag board 72 is extended rearwardly beyond the sprockets 71. It will be evident from an examination of Figure 1 and from the foregoing description of the drag raddle 14 and the drag boards that any recoverable grain released to the drag raddle 14 from the straw will be delivered through the raddle 14 at the lower end of the drag board 72 to fall on the shoe 18 and be cleaned.

The several beaters are so positioned and operated as to thoroughly work the straw and remove the grain kernels that may be entrapped therein. Directly over the drag board 67 is a large beater 80 that receives the straw, etc. from the beater 12 and turns in the opposite direction so as to feed the straw down against the raddle 14 and rearwardly. This beater 80 has three tubes 81, 82 and 83, each equipped with teeth 84. The tubes are secured together by end pieces 85 that are fixed on a driven shaft 86.

A beater 87 which is triangular in cross section is rotatably mounted directly behind the downwardly travelling portion of the raddle between the guide rollers 68 and 69. This beater has teeth 88 at the corners which travel close to the raddle 14. The direction of rotation of the beater 87 is such that the teeth closest to the raddle 14 travel upward to lift the straw away from the raddle. Another beater 89 having teeth 90 cooperates with the beater 87 to throw the straw down onto the raddle 14 about midway between the ends of the drag board 70.

The final beater 91 is slightly spaced rearwardly from the rear most portion of the raddle 14. It has teeth 92 which just clear the rear end of the drag board 72. This beater lifts the straw away from the raddle and discharges it.

The construction which I have described in detail is particularly effective in the harvesting of wheat. It is believed to be evident that the most of the threshed out grain will drop from the discharge end of the conveyor 10, while the beaters 11 and 12 are lifting the straw from this end of the conveyor. But this material does not fall directly upon the shoe 18. The saddle member 17, positioned between the discharge end of the conveyor 10 and the front end of the grain shoe has its top deflecting surface 16 inclined about 45 to 55 degrees to the vertical and facing rearwardly so that it deflects the falling material and discharges it horizontally rearward so that the air stream from the blower 37 can separate light from heavy material more readily. In this way the chaff is kept floating rearwardly without clogging the grain screen.

A small amount of the remainder of the grain recovered from the straw falls down between the baffle 15 and the raddle 14. However, most of this remainder will be gathered on the drag boards 67 and 70 and delivered onto the drag board 72. This grain is discharged from the lower end of the drag board 72 and is cleaned of chaff, etc. as it falls by the rearwardly flowing air stream from the blower 37. Any unthreshed heads of grain, being heavier than chaff or straw, will settle to the grain shoe by the time they reach the rear end of the shoe 18. The upwardly deflected air stream from the pan 49 keeps chaff and straw from entering the pan 49 with these heavier heads and keeps the chaff and straw floating until it is discharged from the machine.

The drive mechanism for the various parts of the machine is conventional and has not been described. The directions of movement of the raddle 14 and the several beaters and blowers are indicated by arrows in Figure 1 of the drawings. It is believed that the nature and advantages of my invention will be apparent from the foregoing description.

Having described my invention, I claim:

1. In a separator for a combine harvester having a separator housing, a conveyor mounted therein to feed cut and threshed crop rearwardly into said housing and a vibrating grain shoe suspended in said housing positioned below the level of discharge of the crop from the conveyor and extending rearwardly in the housing beyond said conveyor, the improvement comprising a grain deflecting saddle member supported on the shoe between the discharge end of said conveyor and the grain shoe, said saddle member having a rearwardly and upwardly facing surface receiving grain from said conveyor and deflecting it rearwardly over the shoe, blower means in the housing beneath the saddle member, said blower means having air deflection means thereon directing the stream of air upwardly through the shoe and rearwardly across the lower edge of the saddle through the path of the grain deflected rearwardly from the saddle, barrier means along the top and along the bottom surface of said saddle carried by said saddle and engaging the conveyor and the housing forwardly of the outlet of said blower means to prevent air from passing from the blower upwardly in front of the saddle member.

2. In a separator for a harvester having a separator housing having spaced apart side walls, a conveyor mounted therein to feed cut and threshed crop rearwardly into said housing and a vibrating grain shoe suspended in said housing positioned below the level of discharge of the crop from the conveyor and extending rearwardly within the housing beyond said conveyor, the improvement comprising an endless drag raddle in said housing having an upper flight and a lower flight extending rearwardly and upwardly over the grain shoe, drag boards beneath said flights and engaged therewith, the raddle comprising a pair of spaced apart endless flexible members adjacent to the housing side walls, rotatable supports mounted in the housing around which said members extend and cross bars connecting the flexible members, the drag boards comprising continuous surfaces extending from one side wall to the opposite side wall of the housing, said cross bars being slidably supported on the surfaces of the drag boards and the drag boards beneath one of said flights being depressed adjacent the side walls to provide channels in which said endless members travel.

3. In a separator for a combine harvester having a separator housing, a conveyor mounted therein to feed cut and threshed crop rearwardly into said housing and a vibrating grain shoe suspended in said housing positioned below the level of discharge of the crop from the conveyor and extending rearwardly in the housing beyond said conveyor, the improvement comprising a grain deflecting saddle member supported on the shoe between the discharge end of said conveyor and the grain shoe, said saddle member having a rearwardly and upwardly facing surface inclined at an angle between 45 degrees and 55 degrees to the vertical operable to deflect grain falling from the conveyor rearwardly over the shoe, a resilient guard strip on the upper end of the saddle engaging with the conveyor, a guard strip suspended from the saddle and a baffle wall across the housing below the saddle on which the last named guard strip rides.

References Cited in the file of this patent

UNITED STATES PATENTS

| | | |
|---|---|---|
| 187,607 | Elward | Feb. 20, 1877 |
| 296,441 | Parrish | Apr. 8, 1884 |
| 416,464 | Laufenburg | Dec. 3, 1889 |
| 606,681 | Parmley | July 5, 1898 |
| 620,731 | Best | Mar. 7, 1899 |
| 769,948 | Kramer | Sept. 13, 1904 |
| 802,816 | McRae | May 15, 1906 |
| 960,799 | Blewett | June 7, 1910 |
| 1,009,440 | Reed | Nov. 21, 1911 |
| 1,059,108 | Beam | Apr. 15, 1913 |
| 1,443,241 | Radle | Jan. 23, 1923 |
| 1,480,548 | Dore | Jan. 15, 1924 |
| 2,165,888 | Edgington | July 11, 1939 |
| 2,675,809 | Aber et al. | Apr. 20, 1954 |